United States Patent Office 2,844,550
Patented July 22, 1958

2,844,550

POLYMETHYL SILOXANE HEAT RESISTANT INK

Robert G. Hay, deceased, late of Gainesville, Ga., by Lois V. Hay, administratrix, Flowery Branch, Ga., assignor to Lockheed Aircraft Corporation, Burbank, Calif.

No Drawing. Application October 15, 1953
Serial No. 386,409

1 Claim. (Cl. 260—18)

This invention relates to marking materials or compositions and relates more particularly to heat resistant inks. While the inks of this invention are not confined to any particular field of usefulness, they will be referred to herein as being primarily useful in marking parts of aluminum alloy and other metals such as used in the manufacture of aircraft and other vehicles and devices.

In the manufacture of aircraft and other structures and devices embodying a number of parts, assemblies and sub-assemblies, it is necessary to mark the parts for identification and sometimes to indicate the material or metal of which they are constructed. When the parts and/or assemblies are to be subjected to heat treatment, immersion in baths, etc. it has been necessary to scribe or stamp the parts with the identifying indicia or to tie identification tags on them as the presently available inks either injuriously etch the metal of the parts or decompose during the heat treatment or other subsequent processings. The scribing or stamping scars and cuts the parts resulting in undesirable parts and the etching of the metals by the inks likewise damages them. The tying-on and subsequent removal of identification tags are laborious time-consuming operations and the tags are often lost from the parts during handling and processing, leaving the parts without proper identification.

It is an object of the present invention to provide an ink suitable for marking parts and assemblies of aluminum alloys and other metals and alloys that does not etch or otherwise physically or chemically affect the parts and that will survive the heat treatment and other subsequent processing of the parts to remain as legible surface markings thereon.

Another object of the invention is to provide inks of this character that are easy and convenient to use or apply. The inks of this invention may be readily applied by stamping, by brushing, by stencil, etc. and require no special subsequent treatment such as curing, or the like. The inks air dry on the metal surfaces or other surfaces in a short time so as to not interfere with or delay subsequent handling and processing of the parts.

It is another object of the invention to provide inks of this type that dependably withstand the various temperatures to which the parts may be subjected during the heat treatment. The inks may be compounded to withstand, without decomposition, temperatures up to 500° F., temperatures of from, say, 850 to 900° F. and temperatures of about 1000° F.

A further and important object of the invention is to provide inks of this type that in no way injure the surfaces to which they are applied. The inks do not etch the metal surfaces, stain the material or otherwise permanently affect the surfaces and are such that they may be readily removed when desired with common volatile type solvents. However, the dried applied inks are not affected or removed by acids, alkalies or water rinses that may be used in the subsequent processing of the parts.

Other objectives and advantages of the invention may become apparent from the following detailed description of the inks and the manner of preparing the same.

The inks of the invention include a silicone type resin, one or more pigments or dyes, a carrier or thinner, a dispersing agent or emulsifier and preferably a drier.

It is preferred to employ as the resinous component of the ink a silicone resin having good thermal stability and that has the ability to harden at room temperature. It has been discovered that a polymeric silicone oxide having a $CH_3/Si$ ratio of 1:2 is effective when incorporated in the ink formulations of the invention. Such a methyl silicone resin may be prepared commercially by hydrolyzing dimethyl dichlorosilane or its esters, followed by oxidation with air and a catalyst to the desired $CH_3/Si$ ratio or by the hydrolysis of dimethyl dichlorosilane mixed with methyl trichlorosilane or silicon tetrachloride followed by co-condensation of the products. It may also be prepared by partially methylating silicon tetrachloride to the desired $CH_3/Si$ ratio and by hydrolyzing the reaction mixture. The resin is commercially available as a syrup-like liquid. Other silicone resins that have been found to be useful individually or blended with the above polymeric methyl silicone oxide are those where the above ratio is from less than 1:2 to approximately 1:5. Also useful are the polymeric ethyl silicones where the ratio of the $C_2H_5$ to the Si is from 0.5:1.5. The silicone resin component of the ink is employed in the proportion of from 0.5 to 85 parts by weight depending upon whether the ink is to be applied hot or cold, upon the method or device used in its application and upon the ratio of the ethyl or methyl groups to silicon in the resin or resins of the ink, a preferred proportion for application by hand stamp being about 6 parts by weight.

Practically any suitable pigment or dye may be employed in the ink formulations. In practice, lamp black has been found to be effective although cupric oxide and lead dioxide may be used instead of in combination with the lamp black pigment. Of course pigments and/or dyes other than black may be used as desired or required. The pigment or coloring ingredient is used in the proportion of from 0.1 to 15 parts by weight depending upon the density of the color desired and the proportion of resin used in the particular formulation. In the case of lamp black when using 6 parts by weight of resin the lamp black is preferably employed in the proportion of about 1 part by weight.

The thinner or carrier of the ink composition which may be toluene, acetone or xylene, or the equivalent, is employed in the ink formulations in varying proportions depending upon the temperatures to which it is expected the ink is to be subjected. For example, when the parts to which the ink is to be applied are to be elevated to temperatures up to 500° F. the thinner is used in the proportion of about 14 parts by weight, when these temperatures are to be from, say, 500° F. to 900° F. the toluene or other thinner is employed in the proportion of approximately 10 parts by weight, and when the temperatures are to be in the neighborhood of 1000° F. approximately 2 parts by weight of the thinner have been found to be practical and desirable.

The emulsifying and dispersing agent of the ink composition is sodium lauryl sulfate or any selected alkyl aryl sodium sulfate such as the esters of myristyl, decanol, octanol, cetyl and stearyl alcohols. The dispersing agent is used in the proportion of from 0.1 to 10 parts by weight depending upon the concentration of the resin in the given formulations and preferably in the amount of about 0.5 part by weight in inks intended for application by hand stamps such as rubber stamps. The drying agent which serves to facilitate air drying of the applied ink at room temperature may be selected from lead naphthenate, cobalt naphthenate, and lead, manganese and cobalt soaps in the form of resinates and linoleates. It has also been found that terebines and chlorostearates have merit as driers in the inks of the invention. Only a relatively small proportion of the drier is required, it having been found that the drier in the ratio of approximately 8% by weight of the resin is effective and desirable although the drier may be used in the proportion of from 0.1 to 8 parts by weight, dependent upon the resin concentration.

In preparing the ink the dry ingredient or ingredients, pigments, are thoroughly ground and mixed together as in a ball mill, or the like. The liquid ingredients or components are then added and the whole mixture is thoroughly mixed before packaging or placing in the permanent containers. In use, the ink may be applied in practically any manner. It has been found most desirable to apply the ink by means of rubber stamps. The ink should be thoroughly agitated or mixed before being applied to the stamp pad, preferably a cloth pad. The ink may then be stamped on the metal surfaces or other surfaces by the rubber stamps and will fully dry at room temperature in 1 minute or less. As already pointed out, the inks of the invention will not etch or otherwise chemically or physically injure the aluminum alloy parts or other metal parts to which they are applied and yet can be readily removed by acetone or other common volatile solvents. The inks are not decomposed by heat treatment temperatures as high as 1000° F. and withstand immersion, rinsing, etc. of the parts or assemblies to remain thereon as an effective marking material. Although reference has been made to the inks as suitable for use on aluminum alloy parts it is to be understood that they are useful in the various industries where they may be applied to sheet copper or brass, magnesium, titanium, stainless steels, etc., glass and ceramics as well as other materials to be subjected to heat treatment or elevated temperatures.

The invention is not to be regarded as limited to the express procedure or materials set forth, these details being given only by way of illustration and to aid in clarifying the invention. I do not regard such specific details as essential to the invention except insofar as they are expressed by way of limitation in the following claim in which it is my intention to claim all novelty inherent in the invention as broadly as is permissible in view of the prior art.

I claim:

A non-etching ink capable of withstanding temperatures up to 1,000° F. comprising on an approximate part by weight basis from 0.5–85 parts of a polymethyl siloxane resin in which the ratio of $CH_3:Si$ atoms ranges from a ratio of 1:2 to 1:5; from 2–14 parts of a thinner selected from the group consisting of toluene, acetone, and xylene; from 0.1 to 10 parts of sodium lauryl sulfate; from 0.1 to 8 parts of a drying agent selected from the group consisting of lead naphthenate, cobalt naphthenate, lead resinate, lead linoleate, manganese resinate, manganese linoleate, cobalt resinate and cobalt linoleate, and from 0.1 to 15 parts of pigment selected from the group consisting of carbon black, cupric oxide and lead dioxide.

References Cited in the file of this patent

FOREIGN PATENTS 607,022    Great Britain _____ Aug. 24, 1948

OTHER REFERENCES

Fischer: American Ink Maker, April 1943, pp. 19–23 and 45.

Patterson: American Ink Maker, April 1948, pp. 26–28, 55 and 57.